United States Patent
Kitaoka et al.

(10) Patent No.: US 8,910,381 B2
(45) Date of Patent: Dec. 16, 2014

(54) HELICAL GEAR AND METHOD OF MANUFACTURING THE SAME

(75) Inventors: Shinji Kitaoka, Tokai (JP); Keisuke Atsumi, Anjo (JP); Koji Takaira, Okazaki (JP); Seiji Hiroshima, Okazaki (JP); Takaaki Shimizu, Nagoya (JP)

(73) Assignees: Aisin AI Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 1198 days.

(21) Appl. No.: 12/412,875

(22) Filed: Mar. 27, 2009

(65) Prior Publication Data

US 2009/0241711 A1    Oct. 1, 2009

(30) Foreign Application Priority Data

Mar. 28, 2008  (JP) .................... 2008-085640

(51) Int. Cl.
   *B21H 5/00*   (2006.01)
   *B21H 5/02*   (2006.01)
   *F16H 55/08*  (2006.01)

(52) U.S. Cl.
   CPC ............ *B21H 5/022* (2013.01); *F16H 55/0886* (2013.01)
   USPC ...................... 29/893.35; 29/893.3; 29/893.36

(58) Field of Classification Search
   USPC .......... 29/893.35, 893.3, 893.32, 893.36, 893
   See application file for complete search history.

(56) References Cited

U.S. PATENT DOCUMENTS

| | | | |
|---|---|---|---|
| 2,906,147 A | * | 9/1959 | Pelphrey .......................... 72/105 |
| 3,729,967 A | | 5/1973 | Bauknecht et al. |
| 5,930,896 A | * | 8/1999 | Akiyoshi et al. ........... 29/893.32 |

FOREIGN PATENT DOCUMENTS

| | | |
|---|---|---|
| DE | 1 182 508 A | 11/1964 |
| DE | 2 060 579 A | 6/1972 |
| JP | 59-209448 | 11/1984 |
| JP | 9-308934 A | 12/1997 |
| JP | 10-113740 | 5/1998 |
| JP | 2001-340933 A | 12/2001 |
| JP | 2002-210523 A | 7/2002 |
| JP | 2003-71632 | 3/2003 |

OTHER PUBLICATIONS

Official Action issued on Jul. 14, 2011 by the Canadian Patent Office in corresponding Canadian Patent Application No. 2,660,672.
Final Office Action dated Jul. 2, 2010 issued by Japanese Patent office in corresponding Japanese Patent Application No. 2008-085640, with English-language translation.
Official Action dated Feb. 17, 2011, issued by the German Patent Office in corresponding German Patent Application No. 10 2009 001 946.4 and English language translation of the Official Action.
Office Action issued Nov. 12, 2009 by the Japanese Patent Office in Japanese Patent Application No. 2008-085640 and English language translation.

* cited by examiner

*Primary Examiner* — Christopher Besler
(74) *Attorney, Agent, or Firm* — Buchanan Ingersoll & Rooney P.C.

(57) ABSTRACT

A method of manufacturing a helical gear, includes a gear cutting process for forming a roughly-processed gear by applying a gear cutting to an outer circumferential surface of a blank, and a tooth surface forming process for forming a tooth surface by pressing a rolling die against a roughly-processed tooth surface of the roughly-processed gear, wherein a length of a portion of the roughly-processed tooth surface, to which a plastic deformation is applied by the rolling die, in a face width direction is formed to be shorter than a length of a face width of the roughly-processed tooth surface.

16 Claims, 2 Drawing Sheets

HELICAL GEAR AND METHOD OF MANUFACTURING THE SAME

CROSS REFERENCE TO RELATED APPLICATIONS

This application is based on and claims priority under 35 U.S.C. §119 to Japanese Patent Application 2008-085640, filed on Mar. 28, 2008, the entire contents of which is incorporated herein by reference.

FIELD OF THE INVENTION

The present invention relates to a method of manufacturing a helical gear and the helical gear having less changes in an engagement.

BACKGROUND

A method of manufacturing a gear is disclosed in JP9 (1997)-308934A. Disclosed in JP9(1997)-308934A is a method of forming a tooth surface by rolling after a tooth shape is roughly formed from a blank by cutting.

In a case where the tooth surface of the gear is formed by rolling, a load applied to the tooth surface when rolling changes in response to a change in engagement between the tooth surface and a rolling die. When the changes in the load become great, changes in surface pressure applied to the roughly shaped tooth during a deformation processing also become greater. Accordingly, waviness (unevenness) may be formed on the tooth surface. In a helical gear, once a gear specification, a size of a face width and the like are determined, the changes in the engagement between the tooth surface and the rolling die are automatically determined. In order to control a level of the changes in the engagement, the gear specification, such as a width of a gear and the like, the face width and the like need to be changed, which may result it significant design change. For example, an increase of the width of the gear may cause disadvantage in weight and costs. On the other hand, a decrease of the width of the gear may cause difficulties in ensuring a necessary strength of the gear.

A need thus exists to provide a helical gear and a method of manufacturing the same which are not susceptible to the drawback mentioned above.

SUMMARY OF THE INVENTION

According to an aspect of the present invention, a method of manufacturing a helical gear, includes a gear cutting process for forming a roughly-processed gear by applying a gear cutting to an outer circumferential surface of a blank, and a tooth surface forming process for forming a tooth surface by pressing a rolling die against a roughly-processed tooth surface of the roughly-processed gear, wherein a length of a portion of the roughly-processed tooth surface, to which a plastic deformation is applied by the rolling die, in a face width direction is formed to be shorter than a length of a face width of the roughly-processed tooth surface.

According to another aspect of the present invention, A helical gear manufactured by a method, the method includes a gear cutting process for forming a roughly-processed gear by applying a gear cutting to an outer circumferential surface of a blank, and a tooth surface forming process for form a tooth surface by pressing a rolling die against a roughly-processed tooth surface of the roughly-processed gear, wherein a length of a portion of the roughly-processed tooth surface, to which a plastic deformation is applied by the rolling die, in a face width direction formed to be shorter than a length of a face width of the roughly-processed tooth surface.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a helical gear and a method of manufacturing the same will be described below in accordance with the attached drawings.

The method of manufacturing the helical gear includes a gear cutting process, a tooth surface forming process and other necessary processes. In principle, the manufacturing method is applicable to a gear whose tooth trace is angled. Therefore, the helical gear in this embodiment also includes a bevel gear and other gear whose tooth trace is angled.

The gear cutting process is a process for forming a roughly-processed gear by applying a gear cutting to an outer circumferential surface of a blank. A cylinder-like portion, a portion to which teeth are roughly formed, and the like are adaptable as the blank. Further, the blank is manufactured by a general method such as casting, forging, cutting or the like. The gear cutting may be applied to the blank by a general method such as a hob processing, a rack processing and the like. Further, a number of times for applying the gear cutting may be set in accordance with any desired number of times.

A tooth face of the roughly-processed gear (a roughly-processed tooth surface), formed by the gear cutting process, is deformation-processed to form a precise shape (a designed shape) through the tooth surface forming process applied to the gear afterwards. The roughly-processed tooth surface, a length of a portion, to which the plastic deformation is applied by a rolling die in the tooth face forming process (i.e. a portion to be processed), in a face width direction, is processed so as to be shorter than a face width of the roughly-processed tooth surface, which is formed at the gear cutting process.

A method of processing the roughly-processed gear for forming the length of the portion to be processed to be shorter than the face width of the roughly-processed tooth surface is not particularly limited. However, a method of applying a crowning to the roughly-processed tooth surface, a method of applying a relieving to the roughly-processed tooth surface, a method of chamfering and the like may be used for the processing to shorten the portion to be processed than the face width of the roughly processed tooth surface. Specifically, in a case where the hob processing is adapted as the gear cutting process, it may be preferable to use the method of applying the crowning for shortening the length of the portion to be processed than the face width of the roughly-processed tooth surface.

Figure 3:
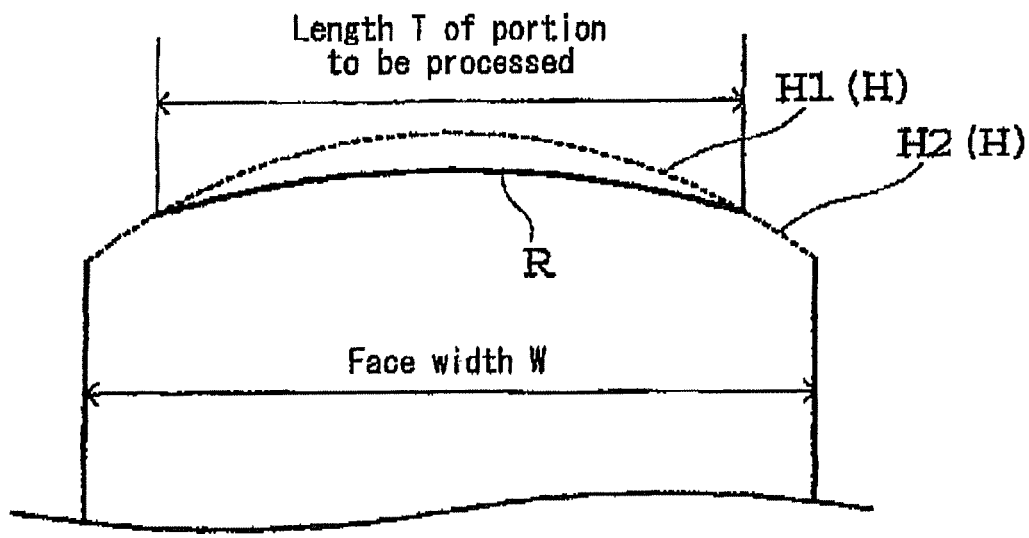
FIG. 3 is a view illustrating a cross section of a tooth of the helical gear, taken along line vertical to a face width, to which a method of manufacturing the helical gear is adapted.
Figure 4:
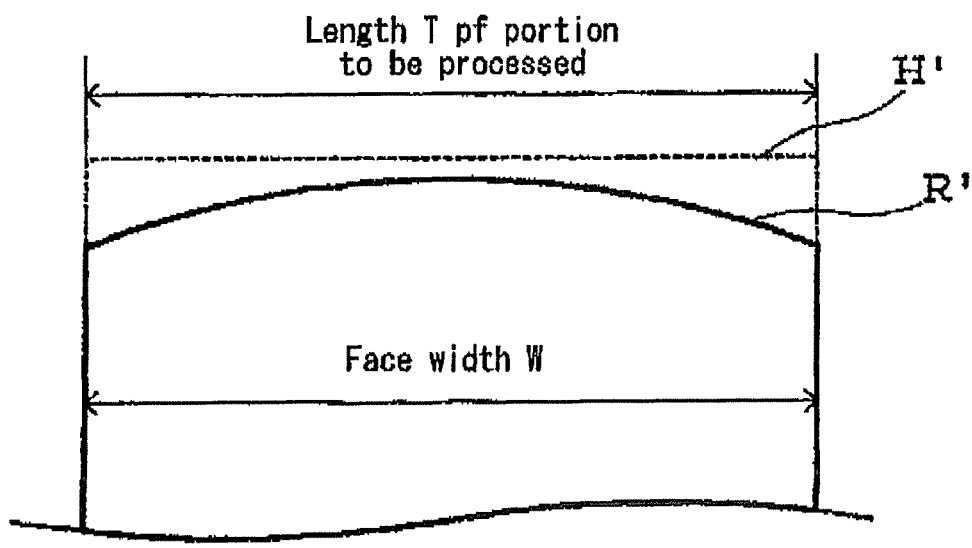
FIG. 4 is a view illustrating a cross section of a tooth of the helical gear, taken along a line vertical to a face width, to which a known method of manufacturing the helical gear is adapted.

For example, in the known method of manufacturing he gear, as illustrated in FIG. 4, a processing is applied relative to a face width W in the gear cutting process so that a shape of the tooth surface becomes a shape H', illustrated by a dashed line. Generally, the shape H' is formed in the gear cutting process regardless of a shape R' to be formed after applying the rolling thereto (i.e. the shape R' to be formed after applying the rolling to the tooth surface is not take into account when forming the shape H' in the gear cutting process). On the other hand, in this embodiment, as illustrated in FIG. 3, a process is applied relative to a face width W in the gear cutting process so that the shape of the roughly-processed tooth surface forms a shape H (H1, H2), illustrated by a dashed line in FIG. 3. The shape H has a rounded shape (e.g. the crowning) approximate to a shape R to be formed after the rolling. Accordingly, a difference between the shape H formed before the tooth surface forming process is applied and the shape R formed after the tooth surface forming process is applied, is small. As a result, a degree of the deformation processing (a crushing amount) by rolling in the face width direction becomes constant and small, therefore an occurrence of waviness (unevenness) on the tooth surface is restricted and an influence of movement of a material of the roughly-processed gear by the deformation processing is minimized. Additionally, by shortening the length of the portion to be processed relative to the face width of the roughly-processed tooth surface, a portion H2, to which the deformation processing by the rolling is not applied, remains at each end portion of the tooth surface in the face width direction.

In order to change a length T of the portion to be processed, which is a portion contacting the rolling die, a gear tooth needs to be formed in the gear cutting process so that tooth thicknesses of both end portions of the roughly-processed tooth surface exceeding the length T become less than tooth thicknesses of the roughly-processed tooth surface corresponding to the length T in order to avoid a contact between the rolling die and the portions other than the length T of the portion to be processed, because a position of the rolling die set in the tooth surface forming process does not change. For example, the length T of the portion to be processed is changeable by changing a curvature of the shape H. More specifically, by setting a curvature of the roughly-processed tooth surface to be greater than a curvature of a die surface of the rolling die, only the portion H1 located in the vicinity of the center portion of the roughly-processed tooth surface contacts the rolling die and is deformation-processed.

The length T of the portion to be processed is adjusted by, firstly, calculating deformation processing bus lines for plural teeth, and then, adjusting changes in a sum of the calculated deformation processing bus lines with time to be smaller. The helical gear is formed by simultaneously deformation-processing the roughly-processed tooth surfaces of the plural gears, therefore, the sum of the deformation processing bus lines of the roughly-processed tooth surfaces at that time (of when the deformation-processing is simultaneously applied to the plural gears) is calculable. The deformation processing bus line refers to a forefront portion of the roughly-processed tooth surface contacting the rolling die and being deformation-processed. The deformation processing bus line is indicated by a substantially straight line.

Figure 1A:
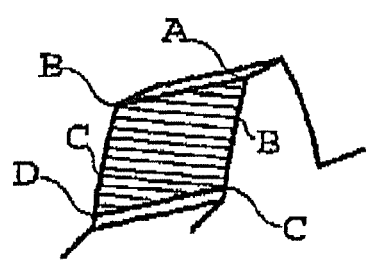
FIG. 1 is a schematic diagram illustrating a change in engagement of a helical gear with time (at a portion to which a plastic deformation is applied in a tooth surface forming process)
Figure 1B:
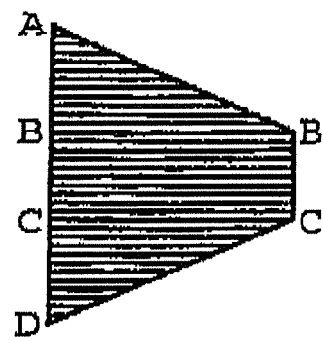

In a forming applied to the tooth surface (the roughly-processed tooth surface) of the helical gear by the rolling die, as illustrated in FIG. 1A, a portion, which contacts the rolling die and to which the deformation processing is applied (the forefront portion to which the deformation processing advances), sequentially shifts from a point A towards a point D as illustrated by lines (the deformation processing bus lines). The lines illustrated on a side surface of the gear tooth in FIG. 1A indicate lengths of contact lines (ideal on geometry) at which the tooth surface contacts the rolling die with progression of the deformation processing in the rolling. Accordingly, illustrated in FIG. 1B is the changes in the length of deformation processing bus line with time (with progressing of deformation processing in the rolling). The length of the deformation processing bus line sequentially increases from zero (0) from the point A up to a point B. After the deformation processing reaches the point B, the length of the deformation processing bus line becomes constant until the deformation processing reaches a point C. The constant length from the point B to the point C is determined as the maximum value of the length of the deformation processing bus line in one tooth surface. Then, the length of the deformation processing bus line is shortened in response to the shift of the deformation processing from the point C towards the point D. When the deformation processing reaches the point D, the length of the deformation processing bus line becomes zero (0). Accordingly, the deformation processing (rolling) of one tooth surface by the rolling die is finished. Accordingly, the length of the deformation processing bus line, which corresponds to a portion of one roughly-processed tooth surface along which the deformation processing advances by the rolling, changes with time from the point A towards the point D, as illustrated in FIG. 1B.

Figure 2:
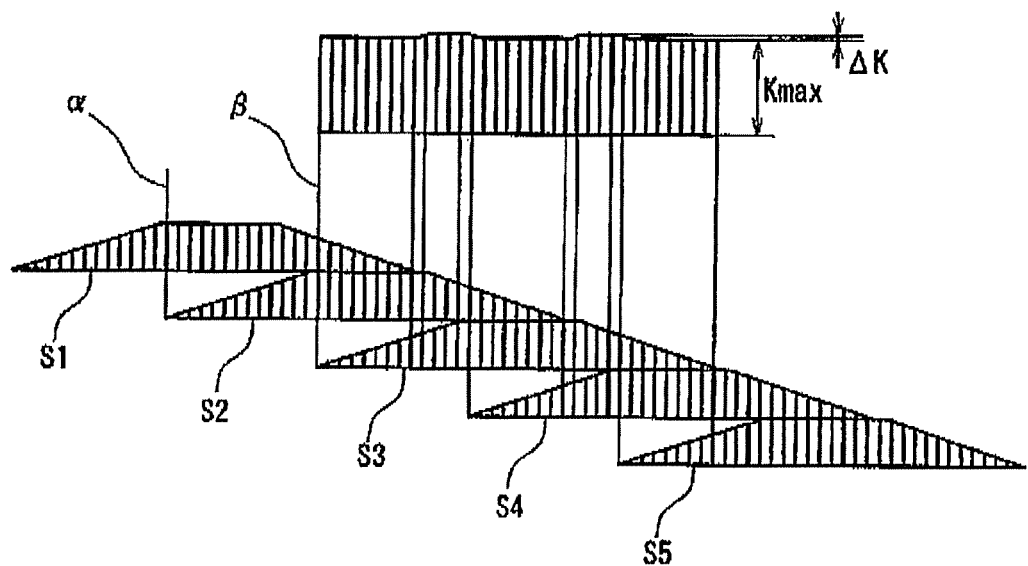
FIG. 2 is a schematic diagram illustrating the change (changes in plural teeth and a sum of the changes in the plural teeth) in the engagement of the helical gear with time (at the portion to which the plastic deformation is applied in the tooth surface forming process)

The helical gears simultaneously engage with one another at the neighboring plural gears. Therefore, in the case of forming the tooth surfaces of the helical gear, the rolling die simultaneously contacts the helical gear at the neighboring plural roughly-processed tooth surfaces and therefore, the deformation processing is simultaneously applied to the neighboring plural roughly-processed tooth surfaces. It is assumed that, for example, three gear teeth are simultaneously engaged with the corresponding gear teeth of the mating gear or the rolling die, in this embodiment. However, the number of gear teeth of the gears simultaneously engaged is not limited to three, but any desired number of gear teeth may be simultaneously engaged with the gear teeth of the mating gear or the rolling die. For example, as illustrated in FIG. 2, in the helical gear to which the rolling is applied from a gear tooth S1 to a gear tooth S5 in the numerical order, there exists a timing $\alpha$ at which the processing is started being applied to the tooth surface of the neighboring gear tooth $\beta$ while the tooth surface of the gear tooth S1 is being processed, then, there exists a timing $\beta$ at which the processing is started being applied to the tooth surface of the neighboring gear tooth S3. At the timing $\beta$ the deformation processing is simultaneously applied to the roughly-processed tooth surfaces of, for example, three gear teeth (the gear tooth S1, the gear tooth S2, and the gear tooth S3) by the rolling die. Each gear tooth has changes in length of the deformation processing bus line as illustrated in FIG. 1. The sum of the lengths of the deformation processing bus lines of the gear teeth S1, S2 and S3 may change by a fluctuation range ($\Delta K$) over a maximum value (Kmax), as illustrated at an upper right portion in FIG. 2. The length of the deformation processing bus line corresponds to a dimension of a portion to be deformation-processed by the rolling. Therefore, when the sum of the lengths of the deformation processing bus lines change, a surface pressure at the portion to be deformation-processed also changes (i.e. a load applied to the portion of the tooth surface to be processed also changes), thereby generating the waviness in response to the changes of the surface pressure on the processed tooth surface.

A level of the changes and a time during which the changes occur while applying the deformation processing by the rolling are changeable by controlling the changes of the deformation processing bus line.

In the known method of forming the helical gear, the maximum value of the deformation processing bus line is automatically determined in response to the face width and the specification, therefore, it is not easy to change. More specifically, in the known method of manufacturing the helical gear, as illustrated in FIG. 4, the face width W corresponds to a width T' (the length of the portion to be processed) to which the processing is applied by rolling. Accordingly, once the face width W is determined, the length T' of the portion to be processed is automatically determined.

On the other hand, in this embodiment, by changing the length T of the portion to be processed, a degree of overlapping the application of the deformation processing in the rolling between the neighboring gears (which corresponds to a relationship between the timing α for the gear tooth S2 and the timing β for the gear tooth S3 in FIG. 2), a degree of changes of the deformation processing bus line from the point A to the point B in FIG. 1 (which corresponds to an inclination from the point A to the point B in FIG. 1B), and a degree of changes of the deformation processing bus line from the point C to the point D (which corresponds to an inclination from the point C to the point D in FIG. 1B) and the like are controlled. By controlling the above-mentioned changes and the overlap and the like, the changes in the sum of the deformation processing bus lines with time in the entire helical gear to be manufactured are controllable. The changes in the sum of the deformation processing bus lines with time (a rate of change of the sum of the lengths of the deformation processing bus lines) is determined so as to be equal to or less than ten percent (10%) with reference to a maximum value Kmax of the sum of the lengths as a reference. Furthermore, the sum of the deformation processing bus lines is controlled so as not to change.

The tooth surface forming process is a process for forming the tooth surface by pushing the rolling die to the roughly-processed tooth surface of the roughly-processed gear. Furthermore, the tooth surface forming process is a process for applying the deformation processing to the roughly-processed tooth surface by using the rolling die and other necessary devices.

Other necessary processes include a heat treatment, such as carbonization processing, induction hardening, nitridization and the like, a process for applying surface treatment, processes for surface processing (honing, shaving, lapping), chamfering, debug and the like for further increasing accuracy in forming the gear teeth.

The helical gear of the embodiment is a helical gear manufactured by the above-described method of manufacturing the helical gear. Accordingly, a length of a portion (the contact line) of the helical gear actually engaging with a mating helical gear is formed to be shorter than the face width. By adjusting the length of the contact line, it may become capable of minimizing the changes in the engagement in the case where the helical gears are used. In other words, as described above, in the helical gears in which plural gear teeth are engaged with the corresponding gear teeth of the mating helical gear at once to transmit a rotational force, changes in a level of a rotational torque to be transmitted is controlled to be smaller by adjusting the changes in the sum of lengths of the contacting portions (contact lines) of the two helical gears when being engaged to be smaller. More specifically, it may be preferable to control the changes in the sum of the lengths of the contact lines to be equal to or less than ten percent (10%) with reference to the maximum value Kmax of the sum of the lengths as the reference.

Accordingly, in the method of manufacturing the helical gear, the changes in the engagement between the roughly-processed tooth surface of the roughly-processed gear and the rolling die may be adjusted so as to be smaller without changing the specification of the helical gear, the width of the gear and the like by forming the length of the portion to be processed to be shorter than the face width. 100301 According to the embodiment, the length T of the portion to be processed is determined so that a change in a sum of lengths of deformation processing bus lines, corresponding to portions at which the roughly-processed tooth surfaces contact the rolling die and to which a deformation processing is applied, with time becomes equal to or less than ten percent (10%) with reference to the maximum value Kmax of the sum of the lengths as a reference.

Accordingly, the changes in the engagement between the roughly-processed tooth surface of the roughly-processed gear and the rolling die are restricted and further, the occurrence of waviness on the tooth surface is restricted by adjusting the length of the portion to be processed so that the changes in the sum of the lengths of the deformation processing bus lines with time to fall within a predetermined range (e.g. the range between 0% to 10%) with reference to the maximum value Kmax of the sum of the lengths.

According to the embodiment, the length T of the portion to be processed is determined so that the sum of the lengths of the deformation processing bus lines, corresponding to the portions at which the roughly-processed tooth surfaces contact the rolling die and to which the deformation processing is applied, becomes always constant.

Accordingly, as illustrated in FIG. 3, the changes in the length of the deformation processing bus line are controllable by shortening the length T of the portion to be processed relative to the face width W. Accordingly, the degree of changes in the sum of the lengths of the deformation processing bus lines, which corresponds to a sum of the engagement amount between the plural tooth surfaces of the roughly-processed gears and the rolling die, is controlled to be smaller. If necessary, the method of manufacturing the helical gear may be modified so as not to generate the changes in the sum of the lengths of the deformation processing bus lines so that the sum of the lengths of the deformation processing bus lines stays always constant.

According to the embodiment, the crowning is provided to the roughly-processed tooth surface in the face width direction.

In the method of adjusting the length of the portion to be processed, the roughly-processed tooth surface is formed to have a shape to which a crowning is provided in the face width direction. Accordingly, the roughly-processed tooth surface is easily formed. Furthermore, the gear teeth are accurately formed (completed). Alternatively, the forming of the accurate tooth surface in the tooth surface forming process may be eased by providing relieving to the roughly-processed tooth surface, instead of the crowning. By providing the crowning, the degree of the plastic deformation (the crushing amount) by the rolling die in the face width direction is set to be approximately constant, thereby restricting the occurrence of the waviness on each tooth surface.

According to the embodiment the curvature of the crowning in the face width direction thereof is set to be greater than he curvature of the rolling die in a face width direction thereof.

According to the embodiment, the length T of the portion to be processed is determined in response to a change of the curvature of the crowning.

Accordingly, in the method of manufacturing the helical gear, the length of the portion to be processed is easily adjusted by setting the curvature of the crowning in the face width direction to be greater than the curvature of the rolling die in the face width direction.

Accordingly, the helical gear is adjusted so that the changes in the engagement with the mating helical gear to be smaller by forming the length of the portion to be processed, which corresponds to a portion actually engaging with the mating helical gear, and the portion, at which the mating helical gear contacts (the contact line), to be shorter than the face width, without changing the specification of the helical gear, the width of the gear and the like.

According to the embodiment, the length T of the portion to be processed is determined so that the changes in the sum of lengths of the contact lines, at which the portion to be processed contacts the tooth surface of a mating helical gear, to be equal to or less than ten percent (10%) with reference to a maximum value Kmax of the sum of the lengths as a reference.

Accordingly, the changes in engagement between the roughly-processed tooth surface of the roughly-processed gear and the rolling die is restricted, and further, the occurrence of the waviness on the tooth surface is restricted by adjusting the length of the portion to be processed so that the changes in the sum of the lengths of the contact lines with time to fall win the predetermined range (e.g. the range between 0% to 10%) with reference to the maximum value as the reference.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method of manufacturing a helical gear, comprising:
   a gear cutting process for forming a roughly-processed gear by applying a gear cutting to an outer circumferential surface of a blank; and
   a tooth surface forming process for forming a tooth surface by pressing a rolling die against a roughly-processed tooth surface of the roughly-processed gear to apply a plastic deformation to the roughly-processed tooth surface by the rolling die, wherein
   a length of the roughly-processed tooth surface of the roughly-processed gear, to which the plastic deformation is applied by the rolling die is shorter in a face width direction than an entire length of the roughly-processed tooth surface of the roughly-processed gear in the face width direction; and
   wherein the length of the roughly-processed tooth surface of the roughly-processed gear being processed varies during the tooth surface forming process.

2. The method of manufacturing the helical gear according to claim 1, wherein, the length of the portion to be processed is determined so that a change in a sum of lengths of deformation processing bus lines, corresponding to portions at which the roughly-processed tooth surfaces contact the rolling die and to which a deformation processing is applied, with time becomes equal to or less than ten percent with reference to a maximum value of the sum of the lengths of deformation processing bus lines as a reference.

3. The method of manufacturing the helical gear according to claim 2, wherein, the length of the portion to be processed is determined so that the sum of the lengths of the deformation processing bus lines, corresponding to the portions at which the roughly-processed tooth surfaces contact the rolling die and to which the deformation processing is applied, becomes always constant.

4. The method of manufacturing the helical gear according to claim 1, wherein a crowning is provided to the roughly-processed tooth surface in the face width direction.

5. The method of manufacturing the helical gear according to claim 2, wherein a crowning is provided to the roughly-processed tooth surface in the face width direction.

6. The method of manufacturing the helical gear according to claim 3, wherein a crowning is provided to the roughly-processed tooth surface in the face width direction.

7. The method of manufacturing the helical gear according to claim 4, wherein a curvature of the crowning in the face width direction thereof is set to be greater than a curvature of the rolling die in a face width direction thereof.

8. The method of manufacturing the helical gear according to claim 5, wherein a curvature of the crowning in the face width direction thereof is set to be greater than a curvature of the rolling die in a face width direction thereof.

9. The method of manufacturing the helical gear according to claim 6, wherein a curvature of the crowning in the face width direction thereof is set to be greater than a curvature of the rolling die in a face width direction thereof 10. The method of manufacturing the helical gear according to claim 4, wherein the length of the portion to be processed is determined in response to a change of the curvature of the crowning.

11. The method of manufacturing the helical gear according to claim 5, wherein the length of the portion to be processed is determined in response to a change of the curvature of the crowning.

12. The method of manufacturing the helical gear according to claim 6, wherein the length of the portion to be processed is determined in response to a change of the curvature of the crowning.

13. The method of manufacturing the helical gear according to claim 7, wherein the length of the portion to be processed is determined in response to a change of the curvature of the crowning.

14. The method of manufacturing the helical gear according to claim 8, wherein the length of the portion to be processed is determined in response to a change of the curvature of the crowning.

15. The method of manufacturing the helical gear according to claim 9, wherein the length of the portion to be processed is determined in response to a change of the curvature of the crowning.

16. A method of manufacturing a helical gear, comprising:
   gear cutting an outer circumferential surface of a blank to form a roughly-processed gear with teeth each having a roughly-processed tooth surface possessing a face width and also possessing an entire area;

pressing a rolling die against only a part of the entire area of the roughly-processed tooth surface of the roughly-processed gear to effect plastic deformation of only the part of the entire area of the roughly-processed tooth surface area by the rolling die; and the face width of the part of the entire area of the roughly-processed tooth surface that is subject to the plastic deformation as a result of the pressing by the rolling die being less than the face width of the entire area of the roughly-processed tooth surface of the roughly-processed gear, the face width of the part of the entire area of the roughly-processed tooth surface subject to the plastic deformation also varying during the pressing by the rolling die.

\* \* \* \* \*